United States Patent [19]
Maxwell et al.

[11] Patent Number: 5,941,472
[45] Date of Patent: Aug. 24, 1999

[54] FILM SUPPLY AND TAKE-UP APPARATUS

[75] Inventors: Ian Maxwell, Oakville, Canada; Christoph Dobler, Munich, Germany

[73] Assignees: IMAX Corporation, Ontario, Canada; Kinoton GmbH, Germering, Germany

[21] Appl. No.: 09/044,233

[22] Filed: Mar. 19, 1998

[51] Int. Cl.[6] .................................................. G11B 25/06
[52] U.S. Cl. ...................................... 242/328.2; 352/128
[58] Field of Search ................................ 242/328.2, 328, 242/328.1; 352/128

[56] References Cited

U.S. PATENT DOCUMENTS

| | | | |
|---|---|---|---|
| 3,780,959 | 12/1973 | Burth | 242/328.2 |
| 3,823,890 | 7/1974 | Potts | 242/328.2 |
| 4,010,910 | 3/1977 | Boudouris et al. | 242/328.2 |
| 4,169,566 | 10/1979 | Boudouris et al. | 242/328.2 |

OTHER PUBLICATIONS

Internet Image print–out entitled: "Film Handling Equipment".
Internet Image print–out entitled: "Strong Products & Services".

*Primary Examiner*—John Q. Nguyen
*Attorney, Agent, or Firm*—Bereskin & Parr; Kilpatrick Stockton LLP

[57] ABSTRACT

A reel unit for supply and take-up of film from at least one motion picture projector includes an upright support column and a plurality of film platter-support arms that extend generally horizontally from the column at vertically spaced positions. The arms are alternately offset laterally from one another to facilitate access to film on platters below the top arm. Each arm carries a platter drive hub provided with upwardly projecting drive pins that engage in openings in the platter so that the platter can be lifted off the arm. This allows the platters to be interchanged between different arms. Film take-up and pay-out cores can be interchangeably mounted on the platters so that any one platter can serve as a supply platter or a take-up platter irrespective of its position on the column. For the same reason, the column carries, in association with each arm, a set of rollers for guiding film being paid out from a platter on that arm or being wound onto the platter.

11 Claims, 6 Drawing Sheets

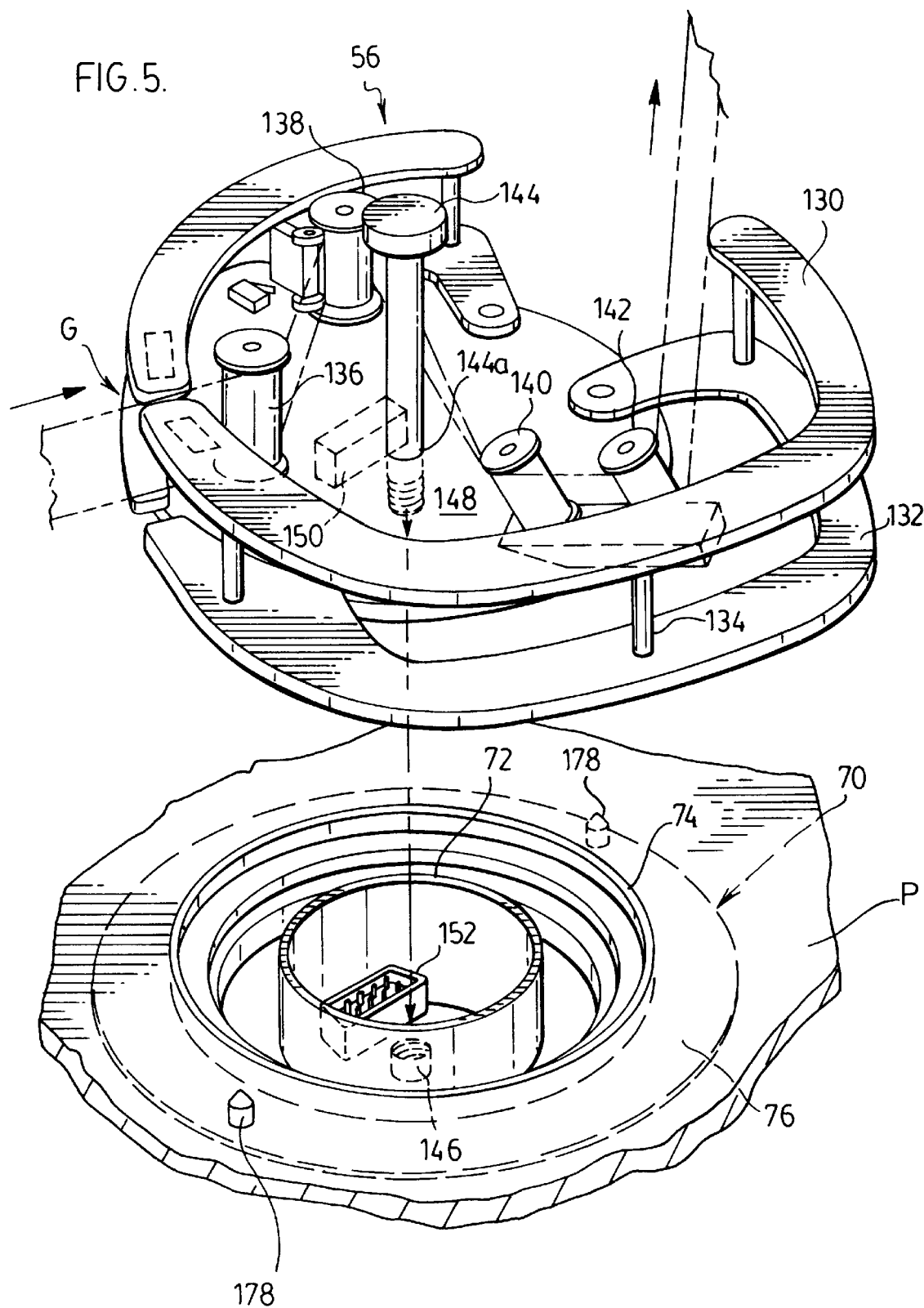

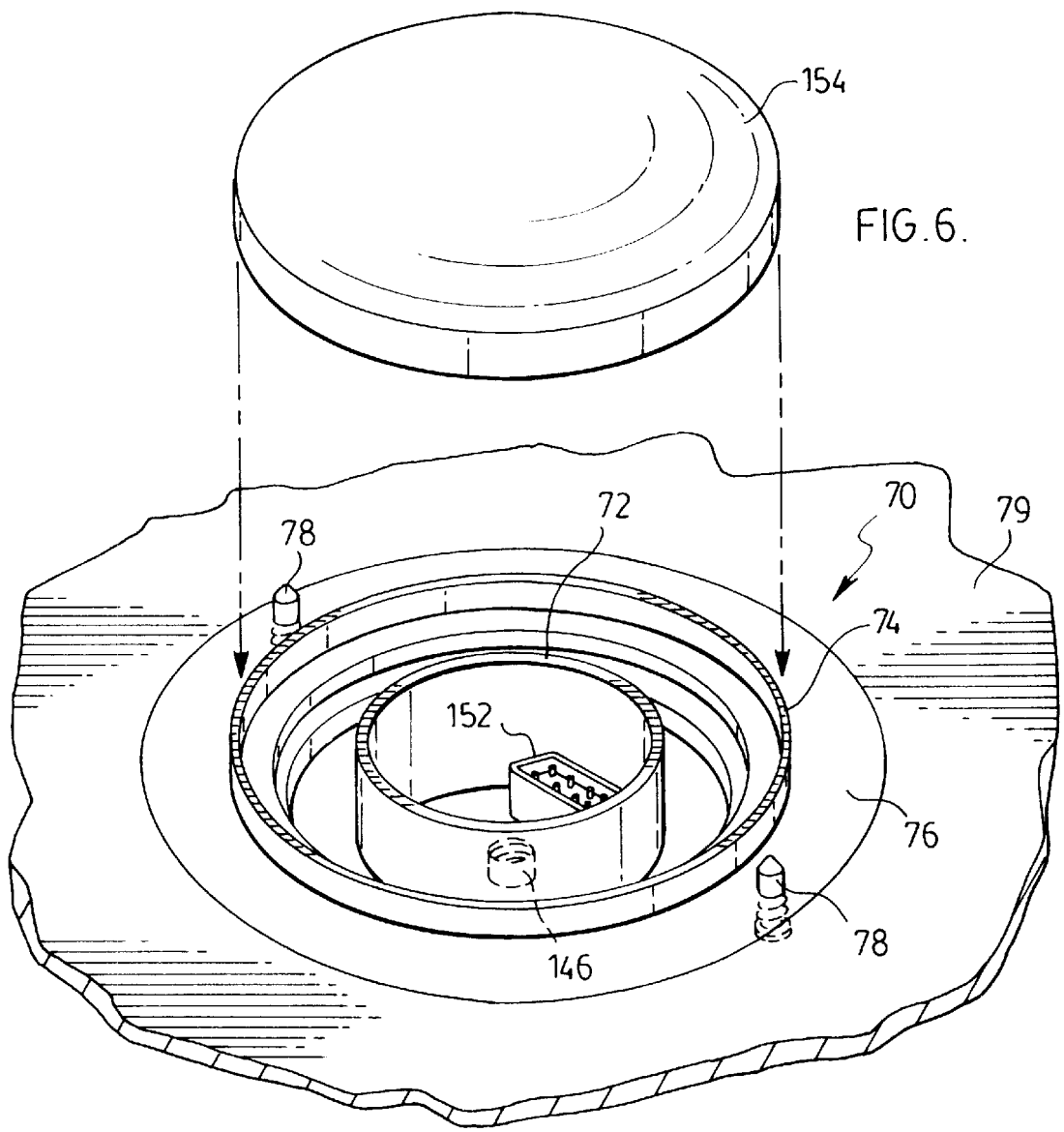
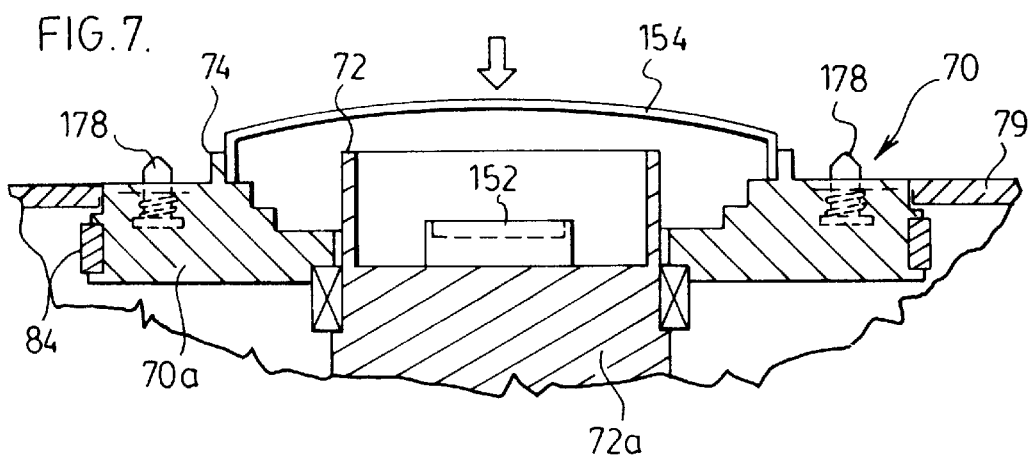

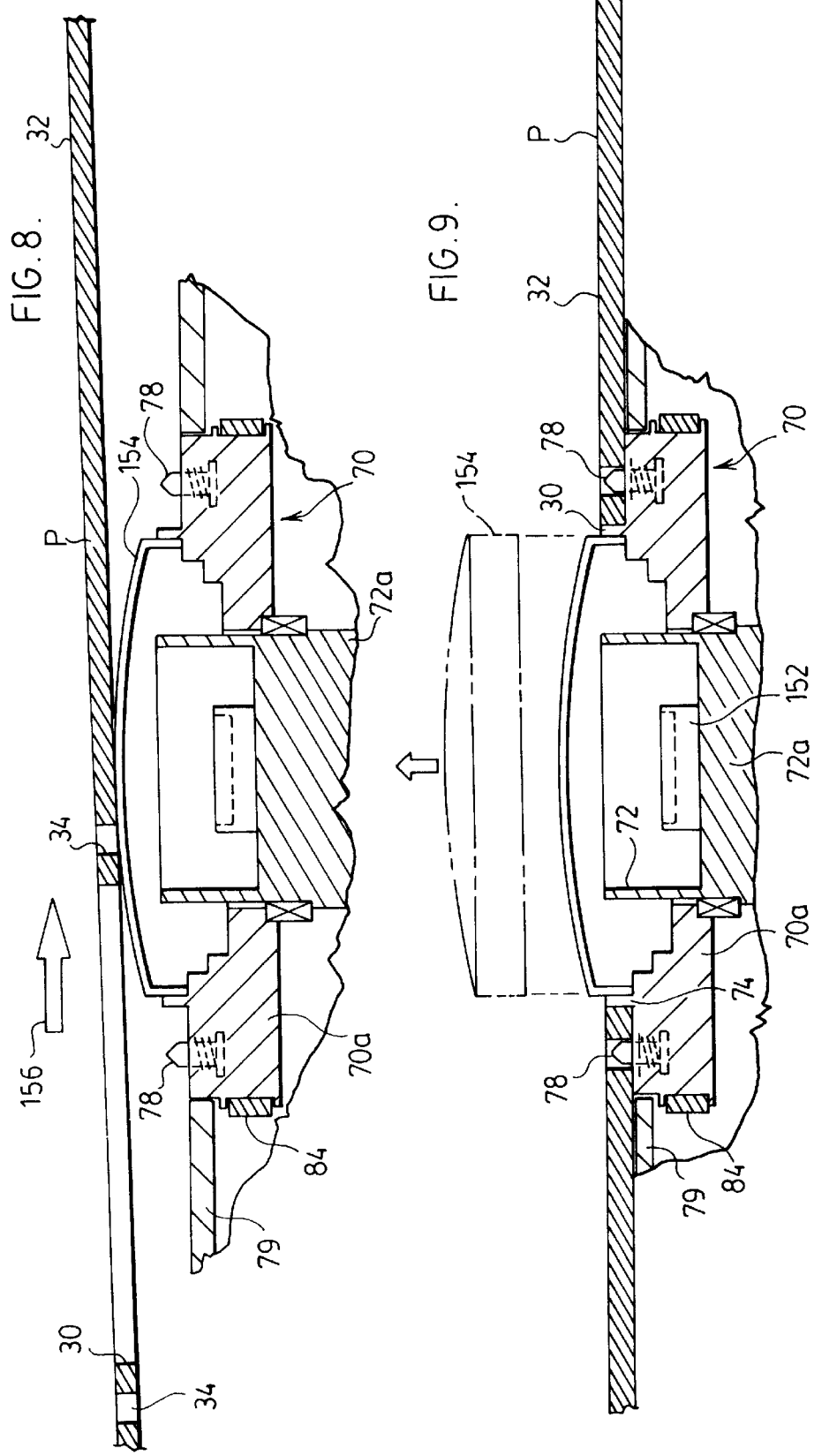

FILM SUPPLY AND TAKE-UP APPARATUS

FIELD OF THE INVENTION

This invention relates generally to film supply and take-up apparatus, primarily for motion picture projectors. More particularly, the invention is concerned with a so-called "no-rewind film unit" for one or more projectors.

1. Background of the Invention

Motion picture films of any significant length traditionally are shipped to the theatre broken down into sections which are spliced together end-to-end in the theatre to assemble the complete film. Each section is wound onto a reel of a relatively small diameter convenient for shipping. In the theatre, the first reel is placed on a make-up table and wound from there onto a film supply platter of a reel unit adjacent the projector. A reel carrying the second film segment is then placed on the make-up table and its leading end is spliced to the trailing end of the first section of film that is now on the platter. The reel unit is then operated to wind the second section onto the platter. Additional sections are successively added by splicing to assemble the complete film.

When the film is to be projected, the leading end of the film is threaded through the projector and back to a second, take-up platter on the reel unit. When the projector is run, the film is unwound from the supply platter and wound onto the take-up platter. At the end of the show, the film is then rewound onto the supply platter ready for showing again.

In a traditional theatre, the film will remain on the same reel unit for the duration of the "run" of the film, which often will be several weeks. Only at the end of the run will the film be unloaded and broken down into its individual sections ready for re-shipping.

Traditional programming formats provide for a significant period of time between successive shows; this allows time for the film to be rewound and threaded into and through the projector ready for the next show. However, there is an increasing demand for more flexibility in programming including the ability to successively show several different motion pictures, sometimes including 3-D films. Flexibility to switch between 2-D and 3-D films for successive shows also may be desirable. Two film strips usually are required for 3-D shows, which means that the reel unit must provide two supply platters and two take-up platters.

These considerations have led to the need for a reel unit that is more flexible than traditional reel units in allowing quick changeover between different films and between 2-D and 3-D film formats.

2. Description of the Prior Art

So-called "no-rewind reel units" have been developed to avoid the need to rewind the film between successive shows. Obviously, if the leading end portion of a film is taken off from the periphery of a coil of film on a platter and wound directly on to a centre "core" carried by take-up platter, the leading end of the film will be at the centre of the coil on the take-up platter, which inevitably means that the film will have to be rewound. In a no-rewind reel unit, the film is wound onto the supply platter with the leading end at the centre of the coil. When the film is projected, the leading end is taken off from the centre of the coil on the supply platter, fed through the projector and then wound onto the core at the centre of the take-up platter. The supply platter is fitted with a special core that incorporates a mechanism designed to allow the film to be unwound from the centre of the coil. At the end of the show, that mechanism is transferred to the take-up platter. For the next show, the take-up platter becomes the supply platter and vice versa.

Examples of no-rewind film supply units of this type are disclosed in U.S. Pat. Nos. 3,780,959 (Burth), 3,823,890 (Potts) and 4,169,566 (Boudouris, et al.), the disclosures of which are incorporated herein by reference.

SUMMARY OF THE INVENTION

An object of the present invention is to provide a no-rewind film supply and take-up apparatus that is capable of accommodating greater flexibility in programming than conventional reel units.

The apparatus provided by the invention includes a support structure having a base, a column extending upwardly from the base and a plurality of platter-support arms that extend generally horizontally from the column and are vertically spaced from one another. A plurality of film platters are provided, one for each arm. Each platter defines an axis of rotation and has an upper surface for supporting a coil of film concentrically about said axis. A platter drive hub is rotationally mounted on each arm and has an upper surface for supporting one of the film platters. Means is provided for driving the hubs to rotate the platters and coupling means is provided between each hub and a platter supported thereon. The coupling means comprise respective formations on the hub and platter which are engageable and disengageable by vertical movement of the platter with respect to the hub so that the platter can be lifted off the hub, whereby the platters can be interchangeably mounted on different ones of the hubs. When the formations are engaged, they are capable of transmitting rotational movement of the hub to the platter.

A plurality of film cores are provided including at least one film take-up core onto which an incoming film can be wound, and at least one film pay-out core for unwinding film from the centre of a coil of film, together with means for removably mounting each core on any of the platters concentrically about the axis of rotation of the platter. Vertically adjacent arms of the support structure are angularly offset from one another about the column and are spaced vertically sufficient to facilitate access to and interchange of film cores between different ones of the platters and permit removal and replacement of any platter while other platters are in use. A plurality of sets of film guide rollers are carried by the column and include, in association with each platter, at least one roller in an upper position for guiding film being paid out from that platter and at least one roller in a lower position for guiding film being wound onto that platter.

It will be appreciated that the apparatus provided by the invention (reel unit) is capable of accommodating much greater flexibility in programming than is possible with traditional units, even traditional no-rewind units. Platters loaded with film can be interchanged between different arms of the reel unit support structure, or platters loaded with one film can be replaced by a platter loaded with a different film, even while other platters are being used for a film that is being shown. All that is necessary is to lift off the platter from the associated drive hub and move it laterally clear of the reel unit. This can be accomplished by hand or by means of a lifting device such as a small fork-lift truck. In the latter case, two forks of the truck can simply be inserted below a platter on opposite sides of the arm, raised to release the platter from the drive hub and then moved laterally away. Installation of a different platter on that hub can of course be accomplished with equal ease in reverse fashion. The fact that the support arms extend outwardly from a single upright column makes for easy access to remove and replace platters.

The minimum number of platter support arms for a reel unit designed to be used with a single 2-D projector probably is three, namely—one arm to support a supply platter, one arm to support a take-up platter and a third arm for a "spare" platter. While one film is being shown, the film moves from the supply platter to the take-up platter. During this time, the "spare" platter can be removed and replaced with a platter carrying the next film to be shown. When the first film is finished, the supply platter is empty and the film from the spare platter can be threaded through the projector and onto the supply platter and the cores interchanged so that the former supply platter becomes the take-up platter for the next film.

Similarly, a reel unit for 3-D films should have a minimum of five arms, two for supply platters, two for take-up platters and one "spare". While the first film is running, the spare platter can be loaded with one of the two film strips for the next show. As soon as the previous show has finished, one of the empty platters that was supplying film for that show can then quickly be replaced with the other film for the next 3-D show. Ideally, six platter support arms would be provided in this case so that both films for the next show could be loaded while the previous show is underway. However, it has been found that space limitations in many typical theatres preclude installation of a reel unit of sufficient height to carry six platter support arms. In principle, however, there is no limitation to the number of platter support arms that could be used.

The precise vertical spacing and lateral offset of the arms is not believed critical and will vary depending the size of the platters and the size of the film, i.e. the vertical height of the film coil on the platter. Sufficient vertical clearance should be allowed that a loaded platter can easily be lifted off and withdrawn from the reel unit without interfering with any of the other platter support arms. A few degrees of angular offset of the arms has been found sufficient to provide the required access for interchange of cores. Clearly, the important consideration is the lateral spacing of the drive hubs carried by the arms, and that will depend both on the angular relationship between the arms and their length.

Finally, the fact that the column of the support structure is provided with two sets of guide rollers for each platter, namely one set for in-coming film and one set for out-going film means that any platter can be threaded up as a supply platter or a take-up platter. In other words, the functions of the platters are completely interchangeable irrespective of the vertical positions of the platters on the support structure.

BRIEF DESCRIPTION OF DRAWINGS

In order that the invention may be more clearly understood, reference will now be made to the accompanying drawings which illustrate a particular preferred embodiment of the invention by way of example, and in which:

FIG. 1a is a perspective view of a "spare" platter shown removed from the reel unit of FIG. 1;

FIG. 5 is a view similar to FIG. 3 but showing a pay-out mechanism used as the core for a supply platter, the mechanism being shown in an exploded position above a typical platter and drive hub;

FIG. 6 is a perspective view somewhat similar to FIG. 5 but showing, in an exploded position, a cap that is fitted to the drive hub during removal or installation of a platter;

FIG. 7 is an elevational view in the direction of arrow C in FIG. 6 showing the cap installed on the drive hub; and, FIGS. 8 and 9 are views similar to FIG. 7 illustrating successive steps in installation of a platter on the drive hub.

DESCRIPTION OF PREFERRED EMBODIMENT

Figure 1:
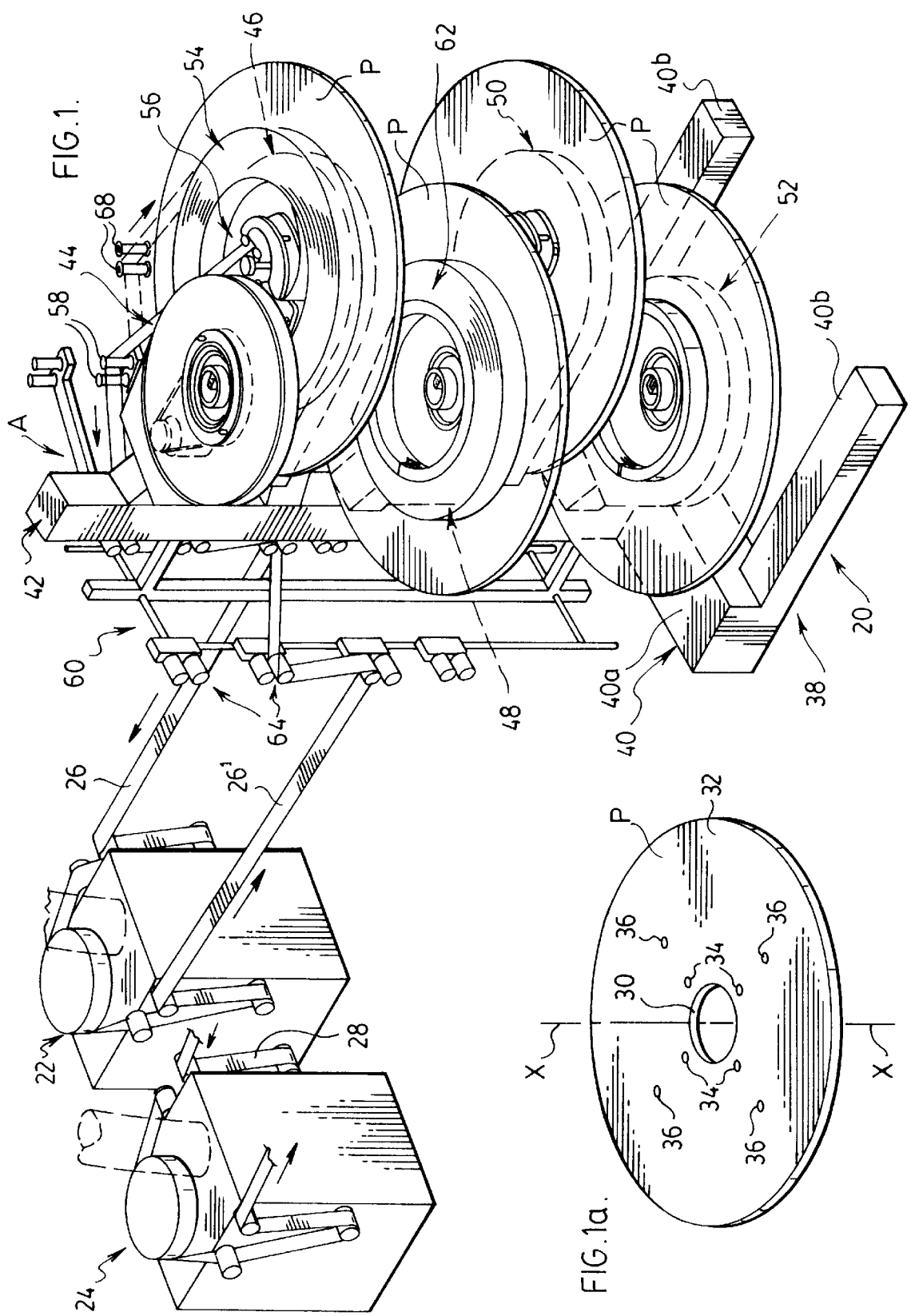
FIG. 1 is a perspective view of a five platter reel unit shown in associate with two motion picture projectors for providing a 3-D show.

Referring first to FIG. 1, a reel unit in accordance with the invention is generally denoted by reference number 20 and is shown in association with a pair of identical motion picture projectors denoted 22 and 24. Details of the two projectors and of technology for providing a 3-D film show presentation are known and form no part of the present invention. For present purposes, it is sufficient to note that a first film strip 26 is shown being transported through projector 22 for projection onto a screen (not shown). This film strip will carry "right eye" images of the 3-D image set that is required. Simultaneously, a second film strip 28 carrying corresponding "left eye" images will be transported through projector 24 for projection. In the interest of clarity of illustration, film strip 26 only has been shown full in FIG. 1.

In this embodiment, the reel unit 20 is capable of supporting five film platters P, namely one supply platter and one take-up platter for film 26 and one supply platter and one take-up platter for film 28, together with a fifth, "spare" platter. Four platters are shown installed on the reel unit and the fifth platter P is shown in FIG. 1a separate from the reel unit 20. It will be seen that each platter is simply a disk-shaped metal plate that extends about an axis of rotation X—X and has a centre opening 30 concentric about axis X—X. The platter has an upper surface 32 for supporting a coil of film concentrically about axis X—X. Outwardly of opening 30 are two concentric series of openings through the platter, the openings in the respective series being denoted 34 and 36 and being spaced mutually at right angles about axis X—X. As will be described in more detail later, the inner series of openings 34 are drive openings for rotating the platter, while the outer series 36 are provided to locate platter cores.

Reverting to FIG. 1, reel unit 20 has a support structure 38 that includes a base 40, a column 42 extending upwardly from the base, and a plurality of platter support arms (in this case five) that extend generally horizontally from the column. The top support arm is fully visible in FIG. 1 because its platter P has been removed, and that arm is denoted 44. The other arms are identical but are visible in dotted outline only; those arms are denoted, respectively 46, 48, 50 and 52. The arms are vertically spaced from one another along column 42 with vertically adjacent arms slightly angularly offset from one another. In this embodiment, it will be seen that the offset results in the top, bottom and centre arms (44, 52 and 48) being vertically aligned with one another, while the intervening arms (46 and 50) are offset from those arms but vertically aligned with one another.

As indicated previously, the amount of the horizontal offset is not believed critical, but should be sufficient to facilitate access to the film cores on the lower platters. At the same time, the vertical spacing between the platters should be sufficient to allow any one platter to readily be removed and replaced by a different platter without interfering with other platters on the reel unit. The platter support arms are cantilevered from column 42 and all extend to the same side of the column; this makes for ease of access, for example, by a fork-lift truck for lifting off any platter from the reel unit. Stability of the support structure is ensured by the design of the base 40. As can be seen, base is essentially a U-shaped structure as seen in plan, in which the column 42 extends vertically upwardly from the midpoint of the centre limb 40*a* of the U, and the side limbs (40*b*) provide a pair of widely spaced support "feet" that are positioned below and slightly outwardly of the vertical series of platters.

As seen in FIG. 1, the platter carried by support arm 46 is acting as a supply platter from which film 26 is being delivered to projector 22. The supply coil of film is denoted 54. Film is being taken off from the centre of the coil via a core pay-out mechanism 56 (to be described—FIG. 5). From mechanism 56, the film passes between a first pair of rollers 58, then around other rollers carried by column 42 (see FIG. 2), and through a roller "matrix" 60 carried by column 42, before travelling generally horizontally from the reel unit to projector 22.

The next platter below (carried by arm 48) is acting as a take-up platter for the same film. The coil of film being taken up onto that platter is indicated at 62. In-coming film from projector 22 travels around and through a series of rollers 64 of matrix 60 before entering coil 62. It can be seen that the rollers in matrix 60 are rotatable about horizontal axes and are used for changing the direction of the film as it approaches and leaves the reel unit. For example, the returning run of film 26 (denoted $26^1$) travels generally horizontally and in a horizontal plane from projector 22. When it enters the matrix, the direction is changed to vertical movement in a vertical plane. The film then leaves an upper roller of a matrix in a horizontal plane following which the film twists into a vertical plane as it approaches platter P. Finally, the in-coming film travels between a pair of vertical rollers 68 carried by a pivoted arm outwardly of the circumference of the platter.

Figure 2:
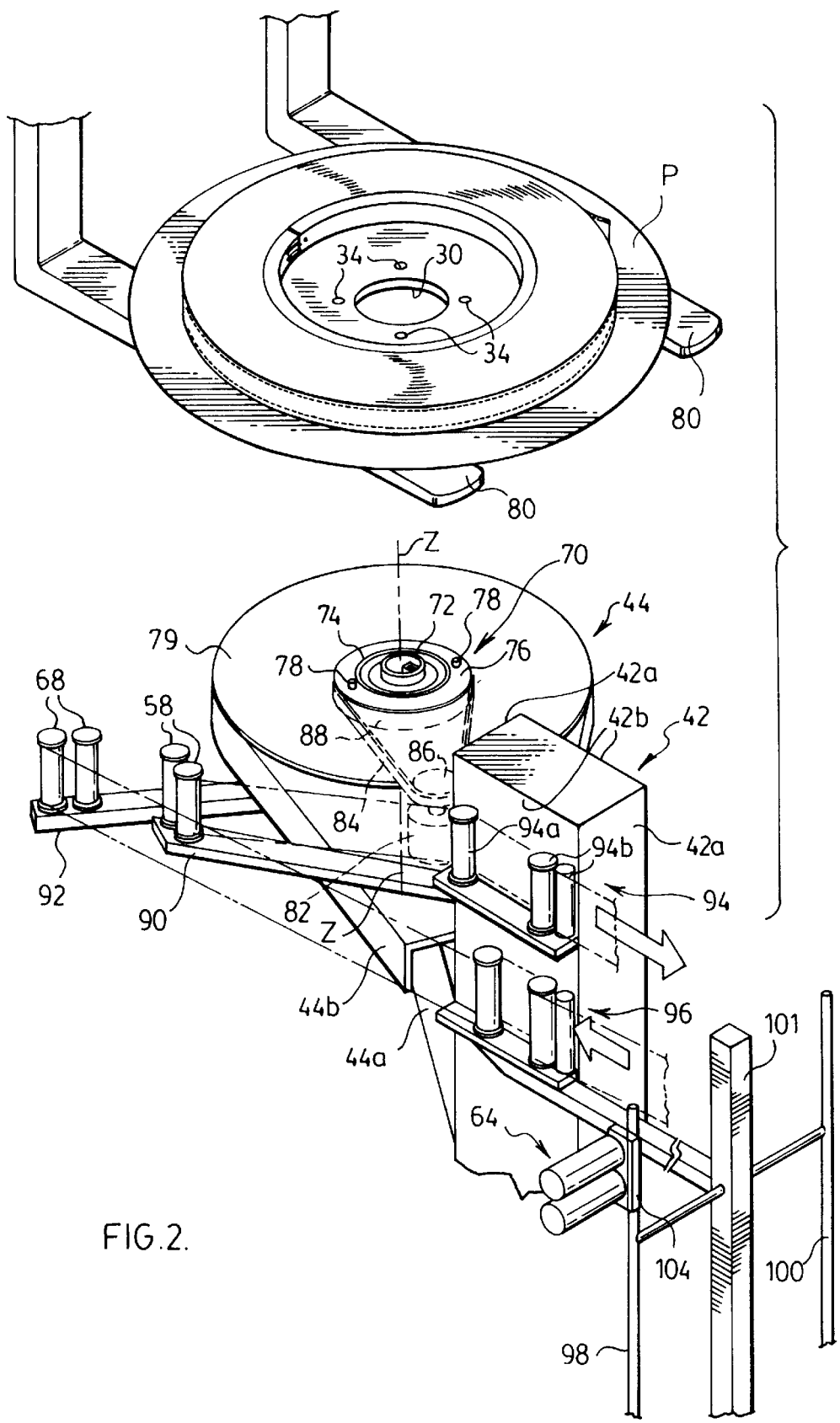
FIG. 2 is a partial perspective view in the direction of arrow A in FIG. 1 showing both the upper platter support arm and a loaded film platter having been lifted from that arm.

As best seen in FIG. 2, each platter support arm has associated therewith an upper pair of rollers, as rollers 58, for out-going film, and a lower pair of rollers, as rollers 68, for in-coming film. In FIG. 1, for illustration only, in-coming film has been indicated in ghost outline passing between the rollers 68 in association with the supply platter carrying film coil 54. This dotted line illustration merely serves to show the relationship between the film, the rollers 68, the film coil and the platter. In fact, the returning film $26^1$ is being wound onto the platter below arm 46, but is not visible in FIG. 1.

FIG. 2 shows the upper part of the support column 42 and the top platter support arm 44 as seen from the direction of arrow A in FIG. 1. It will be seen that column 42 is essentially a box section member of rectangular cross-sectional shape having a pair of narrower end faces 42*a* and a pair of wider side faces 42*b*. Arm 44 includes a channel section member 44*a* that extends outwardly from one of the narrower end faces 42*a* of column 42 and a housing 44*b* of a shape that tapers outwardly towards the out end of arm 44 and has a rounded outer end. A platter drive hub 70 is rotationally mounted in housing 44*b* for turning about a vertical axis Z—Z. Hub 70 includes an upstanding inner annular member 72 which is stationary, and an upstanding outer annular member 74 which rotates on bearings between the two members. A flange 76 extends horizontally outwardly from member 74 and carries a pair of diametrally opposed drive pins 78. As best seen in FIGS. 6 to 9, the drive pins are spring-biassed upwardly. Hub 70 normally supports one of the film platters P. A flat annular member 79 extends outwardly of hub 70 and rotates therewith in housing 44*b*, providing additional support for the platter.

One of the platters P is shown above arm 44, for example, as having been lifted off the arm by a pair of forks 80 of a fork-lift truck (not shown). Platter P is of larger diameter than the maximum width of housing 44*b* and the fork-lift arms 80 are spaced to fit outside the housing but below the platter so that the platter can simply be lifted off the support arm.

The centre opening 30 in platter P is dimensioned to receive the outer annular member 74 of hub 70 when the platter is positioned on the hub. At that time, the drive pins 78 engage in either of the two diametrally opposed pairs of openings 34 in platter P. Two pairs of openings are provided to provide an alternative drive location for the platter, facilitating installation of the platter on the drive hub. The pins 78 and openings 34 provide coupling means between the hub 70 and the platter P which are engageable and disengageable by vertical movement of the platter with respect to the hub so that the platter can be simply lifted off the hub to disengage the drive or placed back onto the hub to re-engage the drive. In practice, it will usually be necessary to turn the platter slightly with respect to the drive hub 70 after the platter has been initially positioned on the hub, to achieve engagement of the drive pins.

The hub itself is driven by a variable speed electric motor 82 that is mounted on the support arm within housing 44*b*. A toothed belt 84 connects a toothed pulley 86 on the motor drive shaft with a corresponding toothed pulley surface on the hub within housing 44*b*. FIGS. 7 to 9 show the hub structure in detail. Briefly, belt 84 extends around the periphery of an annular hub member 70*a* which is carried by bearings on a stationary centre support 72*a* below the annular member 72 referred to previously.

All of the platter support arms are identical and each arm has a drive hub that is driven in the manner shown in FIG. 2 from an individual electric motor as motor 82. When the reel unit is in operation, the particular hub drive motors for the platters that are being used are driven in synchronism with the speed of the particular projector they are serving and the speed of drive is varied to maintain a platter drive speed that matches the speed at which the film is being transported through the projector. Irrespective of whether a particular platter is acting as a supply platter or a take-up platter, it is positively driven; for example, a supply platter does not simply turn as the film is drawn off. Obviously, the speed of rotation of a platter will vary with the diameter of the coil of film on that platter. The speed of each drive motor is controlled to maintain substantially constant film tension, in a manner known per se.

FIG. 2 also shows the pairs of rollers 58 and 68 that were referred to in connection with FIG. 1. As can be seen, the roller pairs are carried by respective support arms 90 and 92. Rollers 58 receive the film as it is being taken off from the centre of a coil as shown in FIG. 1 and therefore are disposed in an elevated position above the coil. As can be seen from FIG. 1 (and from FIG. 5) the film travels obliquely upwardly from the pay-out mechanism 56 as it is drawn off the film coil 54 (FIG. 1). Roller pair 68 is used to guide returning film onto the platter and therefore is positioned generally in vertical alignment with the coil of film as it is located when the platter is installed on the drive hub 70. The two arms 90 and 92 are pivotally supported at their inner ends and located by springs (not shown) that allow the arms to "float" laterally about their respective pivots as in conventional reel units.

Column 42 carries a plurality of sets of film guide rollers including, in association with each platter support arm, at least one roller in an upper position for guiding film being paid out from that platter, and at least one roller in a lower position for guiding film wound onto the platter. FIG. 2 shows the two sets of guide rollers associated with platter support arm 44. An upper set is shown at 94 for receiving film being paid out and a lower set at 96 for receiving in-coming film. In this particular embodiment, each set in fact includes three rollers. Referring to set 94, there is a single roller 94a closest to the platter support arm and a pair of rollers 94b for guiding the film as it travels towards the roller matrix 64 (FIG. 1). A similar arrangement of rollers (though with slightly different spacing) is provided as roller set 96.

FIG. 2 also shows the fact that the roller matrix 64 comprises a pair of vertical rods 98 and 100 carried by a bracket 101 from column 42. Each rod carries a number of pairs of horizontal rollers, one of which is shown at 64. Each roller pair is carried by a support member 104 that can be adjusted vertically on the relevant rod 98 or 100. Each rod 98, 100 is provided with two roller pairs for each platter support arm, one for use when the associated platter is being used as a supply platter and the other for use when the associated platter is being used as a take-up platter. Further down each rod are additional roller pairs that can be positioned at the appropriate vertical location for delivering film to or receiving film from the projectors. A roller matrix of this form is conventionally used in association with known reel units and therefore has not been shown in great detail. Suffice it to note that the matrix allows for almost infinite variation in the points at which the various films enter and leave the matrix and that the roller pairs can quickly be adjusted to provide appropriate film paths depending on which platters are being used.

As explained previously, when a particular platter is being used as a take-up platter, the film is simply wound onto the platter around a core, with the leading end of the film at the centre of the film coil. When a platter is acting as a supply platter, the leading end of the film is taken off from the centre of the coil of film. Accordingly, different cores must be used on the platters depending on the function of a particular platter.

Figure 3:
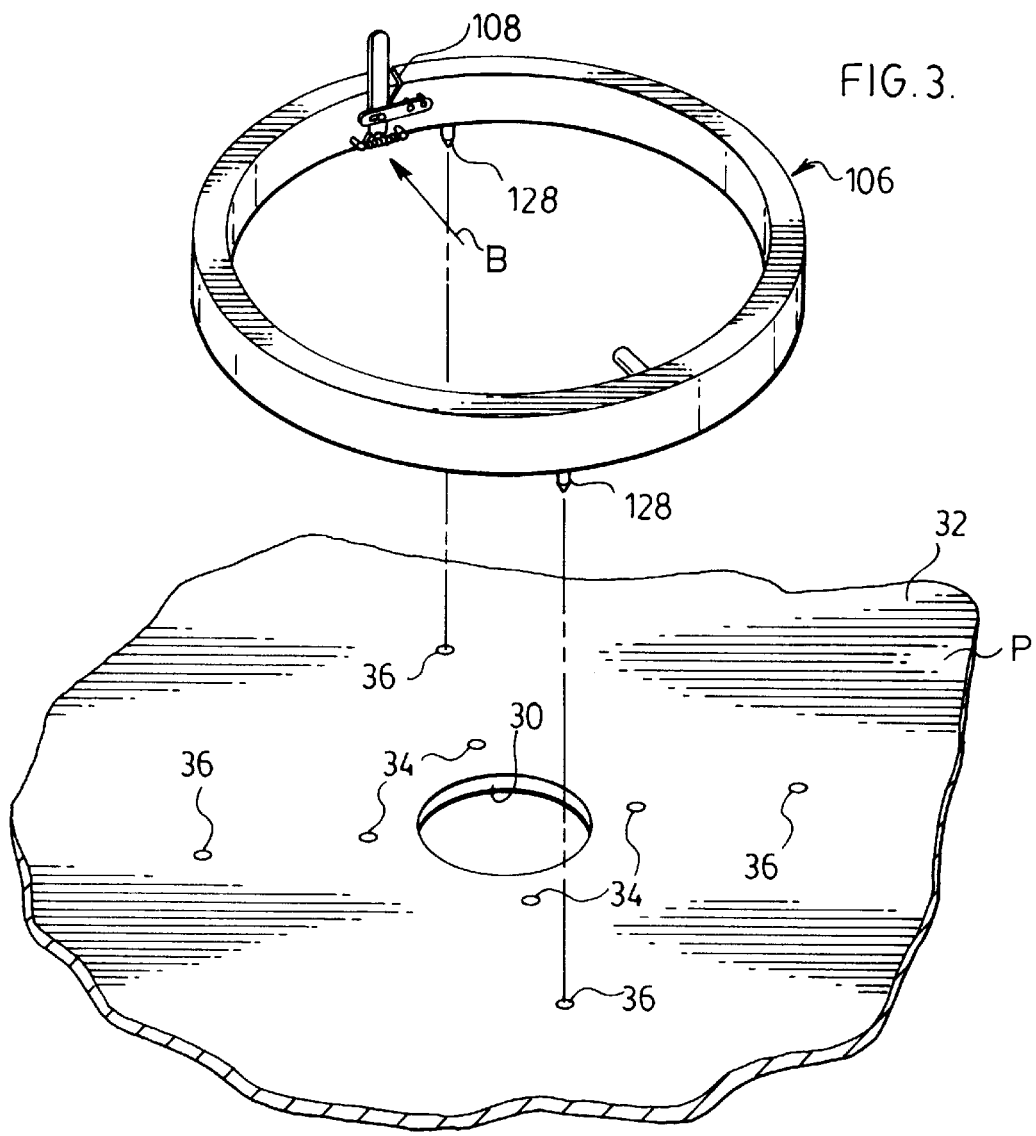
FIG. 3 is a perspective view of a take-up core shown in an exploded position above a typical film platter.
Figure 4:
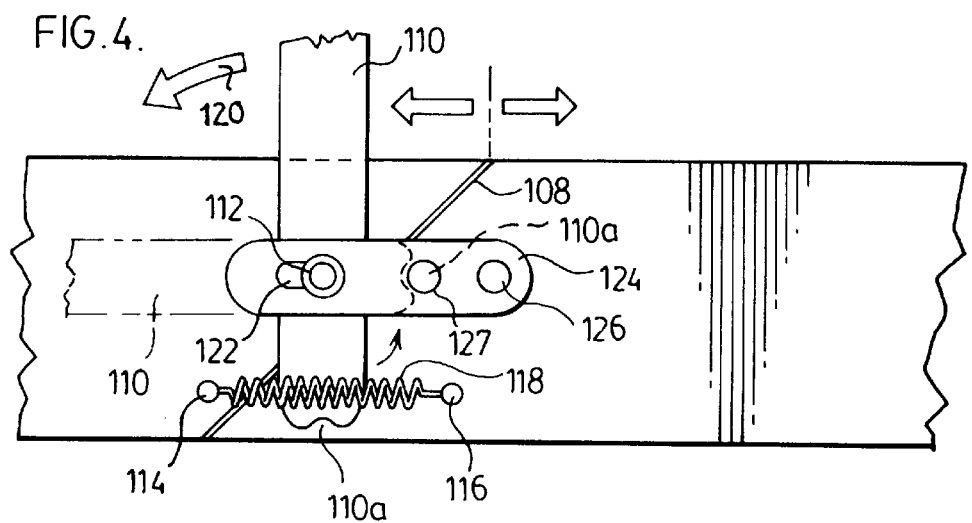
FIG. 4 is a detail elevational view in the direction of arrow B in FIG. 3.

FIGS. 3 and 4 show a core for a take-up platter and FIG. 5 shows a core for a supply platter. The "supply platter" core comprises a film pay-out mechanism of the type referred previously in connection with FIG. 1 and designated by reference numerals 56 in that view.

Referring first to FIG. 3, a film core for a take-up platter is indicated at 106. The core essentially comprises an upright annular member having a gap 108 so that the effective diameter of the member can be changed by opening or closing the gap. The member has a maximum diameter (gap open) when the film is being wound onto the core. After winding has been completed, the gap is closed so that the coil of film is no longer tightly wound on the core. This is accomplished by a simple cam arrangement shown in FIG. 4. A lever 110 is pivoted to the inner wall of the core member adjacent one side of gap 108 and at a position spaced above the lower end of the lever. A pin for lever 110 is denoted 112 in FIG. 4. A pair of pins 114, 116 project inwardly from core member 106 on respectively opposite sides of gap 108 and a tension spring 118 extends between the two pins so as to tend to close the gap (minimum core diameter condition).

Lever pin 112 rides in a horizontal slot 122 in an arm 124 that is fixed to core member 106 at the opposite side of gap 108 by pins 126 and 127. If the upper end of lever 110 is moved to the left in FIG. 4 as indicated by arrow 120, pin 112 will move to the left hand end of slot 122, so that the lower end of the lever exerts a "camming" action on pin 127, opening the gap. A notch 110a in the lower end of lever 110 receives the pin 127 when the gap is fully open, locking the core in its "maximum diameter" condition. When the gap 108 is to be closed, sufficient force is applied to lever 110 in the opposite direction to cause pin 127 to leave notch 110a.

A pair of pins 128 project downwardly from core member 106 generally at diametrally opposed positions and are received in a diametrally opposed pair of the openings 36 (FIG. 1a) in platter P to locate the core on the platter. Again, two diametrally opposed sets of openings 36 are provided in the platter to allow a degree of flexibility of angular positioning of the core member on the platter. One of the pins 128 is positioned immediately adjacent gap 108 (and the other at a diametrally opposed location) so as to minimize binding of the pins in the openings 36 as the gap 108 is opened or closed.

Referring now to FIG. 5, pay-out mechanism 56 is essentially conventional and therefore will be described only briefly.

The mechanism generally has a C-shaped overall configuration as seen in plan and includes respective upper and lower pairs of plates 130 and 132 that are joined by vertical posts 134. The plates define a film entry gap G through which the leading end portion of the film is fed when the reel unit is initially threaded up. Film entering the gap passes successively around vertical guide rollers 136, 138 and then to a pair of inclined rollers 140, 142 which are angled to direct the film obliquely upwardly and out of the pay-up mechanism, as shown in ghost outline in FIG. 3 and as shown in FIG. 1.

The pay-out mechanism 56 is installed on the drive hub 70 of the relevant support arm of the reel unit above the platter. A bolt 144 extends downwardly through the mechanism and is received in a captive nut 146 within the inner annular member 72 of drive hub 70. A shoulder 144a on the bolt bears against a bottom plate 148 of mechanism 56 and the bolt is tightened down into nut 146 to firmly hold the mechanism in place. A plug 150 within mechanism 56 at the time engages a socket 152 within hub 70. The plug and socket provide a transmission link for data indicating the speed of the film through mechanism 56 in manner known per se.

Since hub member 72 is stationary, the pay-out mechanism 56 does not turn with the platter P which carries the film to be paid out. As the platter and film coil rotate with respect to mechanism 56, the film is continuously unwound from the centre of the film coil and guided to the pay-out guide rollers 58 (FIGS. 1 and 2).

It will be appreciated from the foregoing that the take-up core 106 of FIG. 3 or the pay-out mechanism 56 of FIG. 5 can readily be fitted to any one of the platters and that the cores can quickly be interchanged between platters depending on whether a particular platter is to act as a take-up platter or a supply platter. Thus, any one platter can fulfil either function irrespective of its position in the stack of platters of the reel unit.

FIGS. 6 to 9 show a domed cap 154 that can be press-fitted within the outer annular member 74 of the drive hub 70 of any platter to in effect provide a smooth protective surface during installation or removal of a platter. FIG. 6 shows cap 154 in an exploded position above hub 70 while FIG. 7 shows the cap as having been installed on the hub. FIG. 8 shows a platter in the process of being installed. Arrow 156 indicates that the platter is being moved horizontally while resting on cap 154. When the opening 30 in platter P becomes aligned with the annular member 74 of hub 70, the platter will drop down around member 74 and then can be angularly moved to an extent sufficient to cause the pins 78 to engage in openings 34. Cap 154 can then simply be removed as shown in FIG. 9. Typically, the cap is a plastic moulding in a relatively rigid material but having sufficient resilience to allow the cap to make an interference fit within annular member 74 and be readily removed after the platter has been installed. Cap 154 is also used when removing a platter.

In some cases, cap 154 may be unnecessary. For example, if the platter is being positioned manually by two technicians, it may be possible for them to accurately position the platter on the drive hub without having to slide platter. In practice, however, a platter loaded with film can be quite heavy. Also, if a fork-lift truck or other device is used, it may not be possible to accurately position the platter. Thus, cap 154 serves a protective function and avoids damage to either the hub or the underside of the platter that would otherwise occur if the platter were to be dragged horizontally across the hub into its final position.

It will be appreciated that the invention provides a film reel unit that offers significant advantages compared with the prior art in terms of allowing great flexibility of programming, in that it is possible to change films very quickly, even between 2-D and 3-D films or two different 3-D films. In the latter event, it is recognized that, unless a six-platter reel unit is used, some additional time may be required. Nevertheless, even a five-platter reel unit offers significant advantages over prior art units.

It should also be noted that the preceding description relates to a particular preferred embodiment of the invention only and that modifications are possible within the broad scope of the invention. For example, different drive formations could be provided between the drive hub and the platter, e.g. inter-engaging ribbed or toothed annular structures. Also, the precise form of hub drive could of course change. The hubs could be driven from a single drive motor mounted on the column, through variable speed pulleys.

It should finally be noted that, while the invention has been described in the context of motion picture films, the reel unit provided by the invention could be used with other types of films, for example, data storage tapes.

We claim:

1. Film supply and take-up apparatus comprising:
   a support structure including a base, a column extending upwardly from the base, and a plurality of platter-support arms that extend generally horizontally from the column and are vertically spaced from one another;
   a plurality of film platters, one for each platter-support arm, each platter defining an axis of rotation and having an upper surface for supporting a coil of film concentrically about said axis;
   a platter drive hub rotationally mounted on each platter-support arm and having an upper surface for supporting one of said film platters;
   means for driving said hubs to rotate the platters;
   coupling means between each hub and a platter supported thereon, comprising respective formations on the hub and platter which are engageable and disengageable by vertical movement of the platter with respect to the hub so that the platter can be lifted off the hub, said formations when engaged being capable of transmitting rotational movement of the hub to the platter, whereby the platters can be interchangeably mounted on different ones of the hubs;
   a plurality of film coil cores including at least one film take-up core onto which an in-coming film can be wound, and at least one film pay-out core for unwinding film from the centre of a coil of film;
   means for releasably mounting each core on any of said platters concentrically about the axis of rotation of the platter;
   vertically adjacent platter-support arms of the support structure being angularly offset from one another about said column and spaced vertically sufficient to facilitate access to and interchange of film coil cores between different ones of said platters and permit removal and replacement of any platter while other platters are in use;
   and a plurality of sets of film guide rollers carried by said column and including, in association with each platter-support arm, at least one said roller in an upper position for guiding film being paid out from that platter, and at least one said roller in a lower position for guiding film being wound onto said platter.

2. Apparatus as claimed in claim 1, wherein said support structure includes at least five platter-support arms arranged with alternate platter-support arms in vertical alignment, and intervening arms angularly offset from said alternate platter-support arms and vertically aligned with one another.

3. Apparatus as claimed in claim 1, wherein said means for driving the hubs to rotate the platters comprises an individual variable speed drive motor mounted on each platter-support arm and operably coupled to the hub of that platter-support arm for driving the hub.

4. Apparatus as claimed in claim 1, wherein said coupling means between each hub and a platter supported thereon comprises a pair of diametrally opposed drive pins projecting upwardly from said hub and corresponding openings in the platter for receiving said drive pins.

5. Apparatus as claimed in claim 1, wherein each said hub includes a central annular member which is stationary when the hub rotates, for supporting a said pay-out film core, and wherein the core and hub include means for coupling the core to the stationary annular member while permitting rotation of a platter carried by the hub with respect to the annular member.

6. An apparatus as claimed in claim 1, wherein each said take-up film core includes an annular core member about which a film can be wound, said annular core member including a gap permitting the annular core member to adopt a minimum diameter or a maximum diameter in which the gap is respectively closed and open, and wherein the core further comprises spring means normally maintaining the gap closed, and cam means operable to open the gap and adapted to retain the annular core member at said maximum diameter.

7. Apparatus as claimed in claim 6, wherein said means for releasably mounting said core on a platter comprising pins projecting downwardly from a bottom edge of said annular core member and corresponding openings in each said platter for receiving said pins.

8. Apparatus as claimed in claim 1, further comprising, in association with each platter support arm, respective pairs of upper and lower film guide rollers and means supporting each said pair of rollers in a generally vertical orientation adjacent the periphery of a platter supported on the hub of said platter-support arm, said upper pair of roller being disposed in an elevated position for receiving film being paid out from a film coil on said platter, and said lower pair of rollers being positioned generally in alignment with a said film coil for guiding film being wound onto said platter.

9. Apparatus as claimed in claim 1, further comprising a roller matrix carried by said column of the support structure at a side of the column remote from said platter support arms, said matrix including a plurality of sets of rollers that are rotatable about horizontal axes and means supporting said pairs of rollers for adjustment in a vertical direction for guiding film travelling to and from said film supply and take-up apparatus.

10. Apparatus as claimed in claim 1, wherein said base of the support structure has a generally U-shaped configuration as seen in plan, comprising a centre limb from which said column extends upwardly, and a pair of side limbs positioned below and outwardly of said platter support arms.

11. Apparatus as claimed in claim 1, further comprising, in association with each said platter drive hub, a cap adapted to be removably coupled to the hub and providing a protective support surface over which a platter can be moved laterally during installation of the platter on the hub or removal of the platter from the hub.

* * * * *